(12) United States Patent
Matsumura et al.

(10) Patent No.: US 10,471,632 B2
(45) Date of Patent: Nov. 12, 2019

(54) MOLD CLEANING SYSTEM

(71) Applicant: The Yokohama Rubber Co., LTD., Minato-ku, Tokyo (JP)

(72) Inventors: Kensuke Matsumura, Shinshiro (JP); Masayuki Watanabe, Shinshiro (JP); Yusaku Miyazaki, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/773,155

(22) PCT Filed: Nov. 4, 2016

(86) PCT No.: PCT/JP2016/082777
§ 371 (c)(1),
(2) Date: May 2, 2018

(87) PCT Pub. No.: WO2017/078131
PCT Pub. Date: May 11, 2017

(65) Prior Publication Data
US 2018/0319045 A1    Nov. 8, 2018

(30) Foreign Application Priority Data

Nov. 5, 2015 (JP) ................................. 2015-217218

(51) Int. Cl.
*B08B 7/00*     (2006.01)
*B23K 26/02*    (2014.01)
(Continued)

(52) U.S. Cl.
CPC ............ *B29C 33/72* (2013.01); *B08B 7/0042* (2013.01); *B23K 26/02* (2013.01);
(Continued)

(58) Field of Classification Search
CPC .. B08B 7/0042; B23K 26/02; B23K 26/0884; B23K 26/36; B29C 33/72;
(Continued)

(56) References Cited

U.S. PATENT DOCUMENTS 6,369,353 B1    4/2002   Soska
2005/0205539 A1  9/2005  Borgoltz et al.
(Continued)

FOREIGN PATENT DOCUMENTS

JP    2004-018239    1/2004
JP    2004-167744    6/2004
(Continued)

OTHER PUBLICATIONS

International Search Report for International Application No. PCT/JP2016/082777 dated Jan. 17, 2017, 4 pages, Japan.

*Primary Examiner* — Levon J Shahinian
(74) *Attorney, Agent, or Firm* — Thorpe North & Western

(57) ABSTRACT

When cleaning a mold using a mold cleaning system, three-dimensional image data of a molding surface of the mold is acquired by a camera, movement of arms is controlled by a control device based on the acquired image data, and a laser head is moved along the molding surface while a laser beam provided from a laser oscillator is irradiated to remove contamination adhered to the molding surface. Cleaning is performed on a specific site, using a relatively small laser head, or also using a relatively large laser head, or cleaning is performed using a laser head having a variable laser irradiation width and setting an appropriate laser irradiation width for each site to be cleaned.

10 Claims, 9 Drawing Sheets

(51) Int. Cl.
  *B23K 26/08*   (2014.01)
  *B23K 26/36*   (2014.01)
  *B29C 33/72*   (2006.01)
  *B29D 30/06*   (2006.01)
  *G05D 3/12*   (2006.01)
  *B29K 21/00*   (2006.01)
  *B29L 30/00*   (2006.01)
  *B29C 33/70*   (2006.01)

(52) U.S. Cl.
  CPC ........... *B29D 30/0662* (2013.01); *G05D 3/12* (2013.01); *B29C 2033/705* (2013.01); *B29D 2030/0663* (2013.01); *B29K 2021/00* (2013.01); *B29L 2030/00* (2013.01)

(58) Field of Classification Search
  CPC .......... B29C 2033/705; B29D 30/0662; B29D 2030/0663; B29K 2021/00; B29L 2030/00; G05D 3/12
  USPC .... 134/1.1, 22.1, 56 R, 123, 166 R; 425/225
  See application file for complete search history.

(56) References Cited

U.S. PATENT DOCUMENTS

2010/0038560 A1* 2/2010 Tokura .................. B08B 7/0042
                                                           250/492.1
2017/0136720 A1   5/2017 Matsumura et al.

FOREIGN PATENT DOCUMENTS

| JP | 2005-205833 | 8/2005 |
| JP | 2005-532170 | 10/2005 |
| JP | 2008-062633 | 3/2008 |
| WO | WO 2004/007136 | 1/2004 |
| WO | WO 2015/199113 | 12/2015 |

* cited by examiner

MOLD CLEANING SYSTEM

TECHNICAL FIELD

The present technology relates to a molding cleaning system, and particularly relates to a mold cleaning system that can efficiently remove contamination while preventing damage of the molding surface, without manual work, even for a mold having a molding surface with a complex shape.

BACKGROUND ART

A slight amount of contamination derived from a rubber component or compounding agent adheres to a molding surface of a mold for vulcanizing rubber products such as tires or the like every time vulcanization is performed. Contamination gradually accumulates as the mold is used repeatedly, and therefore, leaving the contamination as is negatively impacts the quality of the products to be vulcanized. Therefore, as appropriate, the contamination needs to be removed by cleaning the molding surface. Examples of known mold cleaning methods include shot blasting cleaning methods, laser beam cleaning methods, plasma cleaning methods, and the like.

With a shot blasting cleaning method, the molding surface is easily scratched, and therefore, a laser beam cleaning method where a laser beam is irradiated on the molding surface to remove contamination by a shock wave, or a plasma cleaning method where contamination is chemically reacted and removed by a generated plasma is preferably used in order to prevent scratches on the molding surface caused by cleaning. However, an area that the plasma cleaning method can clean per unit time is small, and therefore, the laser beam cleaning method is more preferable when considering efficiency.

Various mold cleaning methods using a laser beam have been proposed (for example, refer to Japanese Patent Publication Nos. 2008-62633 and 2004-167744). In a cleaning method described in Japanese Patent Publication No. 2008-62633, contamination is removed by irradiating a laser beam ($CO_2$ laser beam) supplied from a laser oscillator on a molding surface of a mold. At this time, an arm (manipulator) that moves the laser head is controlled by original shape data (CAD data and the like) of the mold and position correcting means for the laser head, and the arm moves the laser head along recesses and protrusions on the molding surface (refer to paragraphs [0011] and [0021] to and the like in Japanese Patent Publication No. 2008-62633).

However, the molding surface of the mold is not always formed in the same shape and is formed in various shapes. Therefore, in the method described in Japanese Patent Publication No. 2008-62633, in order to clean molds having different molding-surface shapes, an operation for invoking the original shape data of the mold stored in a control device is required every time mold cleaning is performed. For tire vulcanization molds which include a large variety of molding-surface shapes, there is a problem that checking whether the mold to be cleaned and the original shape data thereof mutually correspond is required every time cleaning is performed, and thus the operation is complicated.

In a cleaning method described in Japanese Patent Publication No. 2004-167744, a laser irradiator is fixed at a predetermined position, and a mold is rotated to move the mold such that the mold surface changes from a vertical orientation to an inclined orientation with regard to an optical axis of the laser beam. A process such as teaching this movement in advance or the like is required in order to rotate the mold in this manner.

SUMMARY

The present technology provides a mold cleaning system that can efficiently remove contamination without manual work, while preventing damage of the molding surface, even for a mold having a molding surface with a complex shape.

In order to achieve the aforementioned object, a mold cleaning system of the present technology includes: a laser oscillator; a laser head that irradiates a laser beam provided from the laser oscillator onto a molding surface of a mold; an arm that freely moves the laser head three-dimensionally; and a control device that controls movement of the arm; where a camera that acquires three-dimensional image data of a molding surface of a mold to be cleaned is provided, a plurality of laser heads with different head sizes are provided as the laser head, which irradiate laser beams and cleans the molding surface while the laser heads are moved along the molding surface by controlling the movement of the arm based on the image data acquired by the camera when cleaning the mold, and cleaning is performed with regard to a specific preset site, using a relatively small laser head, or using a relatively small laser head in addition to a relatively large laser head.

Another mold cleaning system of the present technology includes: a laser oscillator; a laser head that irradiates a laser beam provided from the laser oscillator onto a molding surface of a mold; an arm that freely moves the laser head three-dimensionally; and a control device that controls movement of the arm; where a camera that acquires three-dimensional image data of a molding surface of a mold to be cleaned is provided, a laser head having a variable laser irradiation width is provided as the laser head, which irradiates laser beams and cleans the molding surface while the laser head is moved along the molding surface by controlling the movement of the arm based on the image data acquired by the camera when cleaning the mold, an appropriate laser irradiation width is preset for each site to be cleaned, and the sites to be cleaned are set to the preset laser irradiation width and cleaned.

According to the present technology, when cleaning a mold, three-dimensional image data of a molding surface of the mold to be cleaned is acquired by a camera. Therefore, a shape of the molding surface of the mold can be accurately determined at the time of cleaning. Therefore, there is no need to perform manual operations for invoking the shape data of the molding surface of the mold to be cleaned from a database and checking the correspondence relation between the actual mold and the shape data every time the cleaning is performed. Furthermore, the laser head is moved along the molding surface based on the acquired image data while irradiating the laser beam to clean the molding surface, and therefore, scratches on the molding surface can be prevented while efficiently removing contamination therefrom without requiring manual operation, even for a mold having a molding surface with a complex shape. Furthermore, even in a case where the shape of the molding surface changes over time, image data of the molding surface at the time of cleaning is acquired, and therefore, complete cleaning is performed without leaving traces of contamination as compared to a case where shape data of the molding surface stored in advance is used, which is advantageous.

With the former mold cleaning system of the present technology, a relatively small laser head is used at a specific site where recesses and protrusions are intricately provided in a narrow range on the molding surface for example, and therefore, the laser head can be disposed at an optimal position without interfering with the mold or the like. Therefore, the laser beam can be irradiated evenly even on a portion with a complex shape, and thus contamination is cleanly removed, which is advantageous. Alternatively, for the specific site, an entire body is roughly cleaned using a relatively large laser head, and cleaning can be performed using a relatively small laser head. With a relatively large laser head, the laser irradiation width can be large, and therefore, the cleaning time can be reduced, and thus efficient cleaning is possible.

With the latter mold cleaning system of the present technology, a laser head with a variable laser irradiation width is used, and therefore, cleaning is performed by relatively reducing the laser irradiation width, with regard to a site where recesses and protrusions are intricately provided a narrow range of the molding surface for example. Therefore, the laser beam can be irradiated evenly even for a portion with a complex shape, and thus contamination is cleanly removed, which is advantageous. Furthermore, the laser beam can be irradiated in only an intended range, and the laser beam is not irradiated in an unintended range. On the other hand, cleaning is performed by setting the laser irradiation width to be relatively large, with regard to a relatively flat and wide site. Thereby, a required range can be cleaned in a short period of time.

Herein, for example, a configuration can be such that a cleanliness state of the molding surface is determined based on three-dimensional image data of the molding surface of the mold after cleaning, acquired by the camera, the determined cleanliness state and position information of the molding surface is stored in the control device, and the laser beam is again irradiated from the laser head to performing cleaning with regard to a position of the molding surface where the determined cleanliness state does not satisfy preset standards. With this configuration, only a particularly contaminated position (range) is re-cleaned later, which is advantageous for efficiently and cleanly removing the contamination.

A configuration can be such that a temperature sensor successively detects the temperature of the molding surface where the laser beam is irradiated, and in a case where the temperature detected by the temperature sensor exceeds a preset permissible temperature, irradiation of the laser beam is interrupted. With this configuration, overheating of the molding surface due to the irradiated laser beam can be avoided. In other words, a problem where the molding surface is thermally deformed by the laser beam can be prevented.

Studless-tire vulcanization molds have molding surfaces with complex shapes, and cast splicing molds for pneumatic tire vulcanization have small gaps formed on the molding surfaces, but by applying the present technology, scratches on the molding surfaces can be prevented while efficiently removing the contamination.

DETAILED DESCRIPTION

Figure 1:
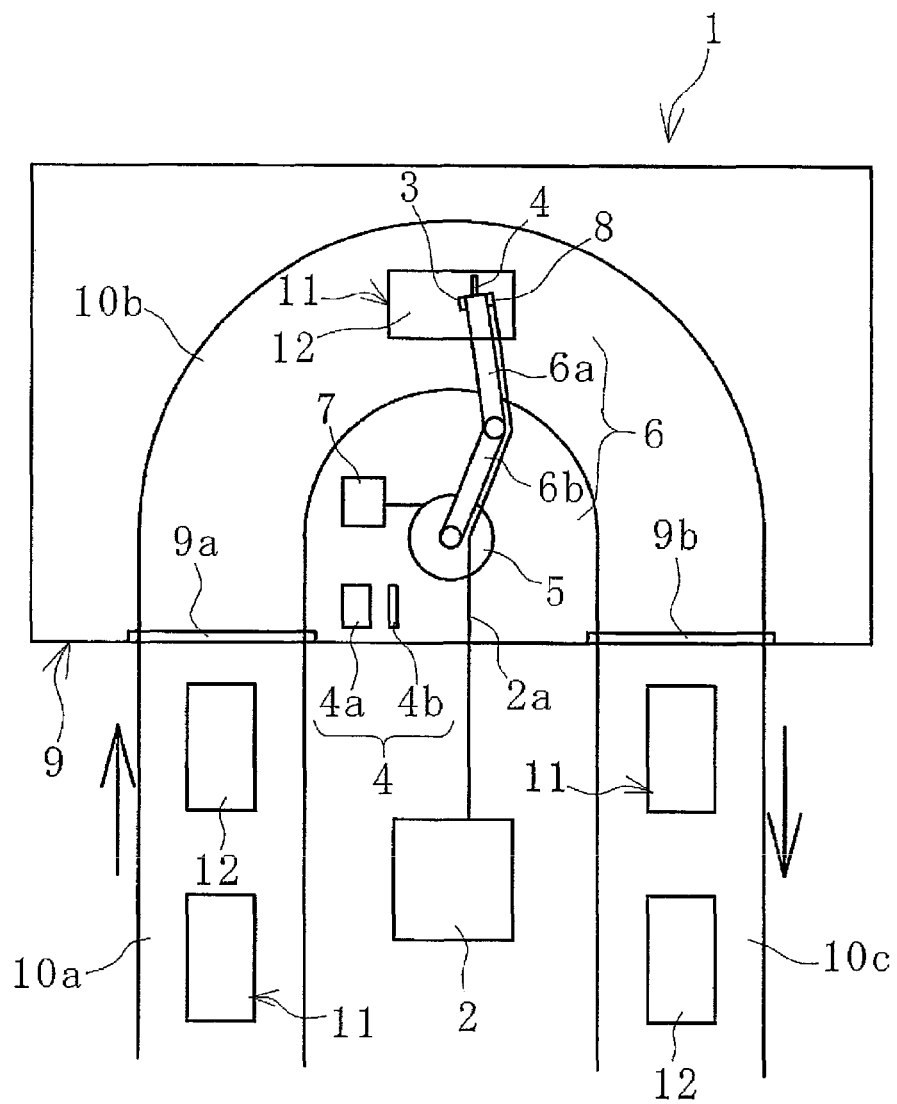
FIG. 1 is an explanatory diagram illustrating a mold cleaning system of the present technology in a plan view.

A mold cleaning system of the present technology is described below based on embodiments illustrated in the drawings.

A tire vulcanization mold is a cleaning target in the following description, but the present technology can also be used to clean molds for vulcanizing rubber products other than tires.

A mold cleaning system 1 of the present technology illustrated in FIG. 1 is provided with a laser oscillator 2, a laser head 4, an arm 6 to which the laser head 4 is attached, a control device 7 that controls movement of the arm 6, and a camera 3. The camera 3 acquires three-dimensional image data of a molding surface 12 of a mold 11. This embodiment further provides a temperature sensor 8 that successively detects a temperature of the molding surface 12 where the laser beam L is irradiated. The camera 3 and temperature sensor 8 are attached to a tip end portion of the arm 6, and the image data acquired by the camera 3 and the temperature data detected by the temperature sensor 8 are input to the control device 7.

Main components of the cleaning system 1 excluding the laser oscillator 2 are internally disposed in a cleaning booth 9 which is a closed space. The cleaning booth 9 is provided with an inlet door 9a and an outlet door 9b and is a structure that is a closed space and that can shield the laser beam L when the inlet door 9a and the outlet door 9b are closed.

A carrying-in conveyor device 10a is connected to the inlet door 9a, and a carrying-out conveyor device 10c is connected to the outlet door 9b. A space between the carrying-in conveyor device 10a and carrying-out conveyor device 10c is an internal space of the cleaning booth 9, and a processing conveyor device 10b is disposed at this position. In this embodiment, the processing conveyor device 10b is bent and extended into an arc shape. The mold 11 to be cleaned is placed on the carrying-in conveyor device 10a, and the cleaned mold 11 is placed on the carrying-out conveyor device 10c. The processing conveyor device 10b functions as a processing table when the mold 11 is cleaned.

The laser oscillator 2 and laser head 4 are connected by an optical fiber cable 2a. The laser beam L supplied by the laser oscillator 2 is transmitted to the laser head 4 through the optical fiber cable 2a. A YAG (yttrium aluminum garnet) laser beam is preferable as the laser beam L used in the present technology.

The laser beam L is irradiated on the molding surface 12 of the mold 11 by the laser head 4. The arm 6 is rotatably attached to an arm base 5 and is configured by rotatably connecting a plurality of arm portions 6a, 6b. The laser head 4 is removably attached to the tip end portion of the arm 6. Therefore, the laser head 4 can freely move three-dimensionally by controlling movement of the arm 6.

In this embodiment, a plurality of laser heads 4a, 4b having different head sizes (volume) are provided. One is a relatively large laser head 4a, and another is a relatively small laser head 4b. The relatively large laser head 4a has a larger laser irradiation width than the relatively small laser head 4b. The relatively large laser head 4a has a configuration where a galvano mirror is internally provided and the laser beam L can be widely irradiated by scanning in a width direction. The laser irradiation width is approximately 4 mm to 70 mm, for example. The relatively small laser head 4b irradiates the laser beam L on a pinpoint. For example, the oscillating frequency of the laser oscillator 2 is 10 to 40 kHz. The frequency at which the laser beam L is scanned in the width direction from the laser head 4a is 20 to 150 Hz, for example. Note that the laser irradiation widths of the laser heads 4a, 4b can be the same.

The laser irradiation widths of the laser heads 4a, 4b can be invariable (set at a predetermined width). Alternatively, the laser irradiation width of one of the laser heads 4a, 4b can be variable, or the laser irradiation widths of the laser heads 4a, 4b can be variable.

Figure 2:
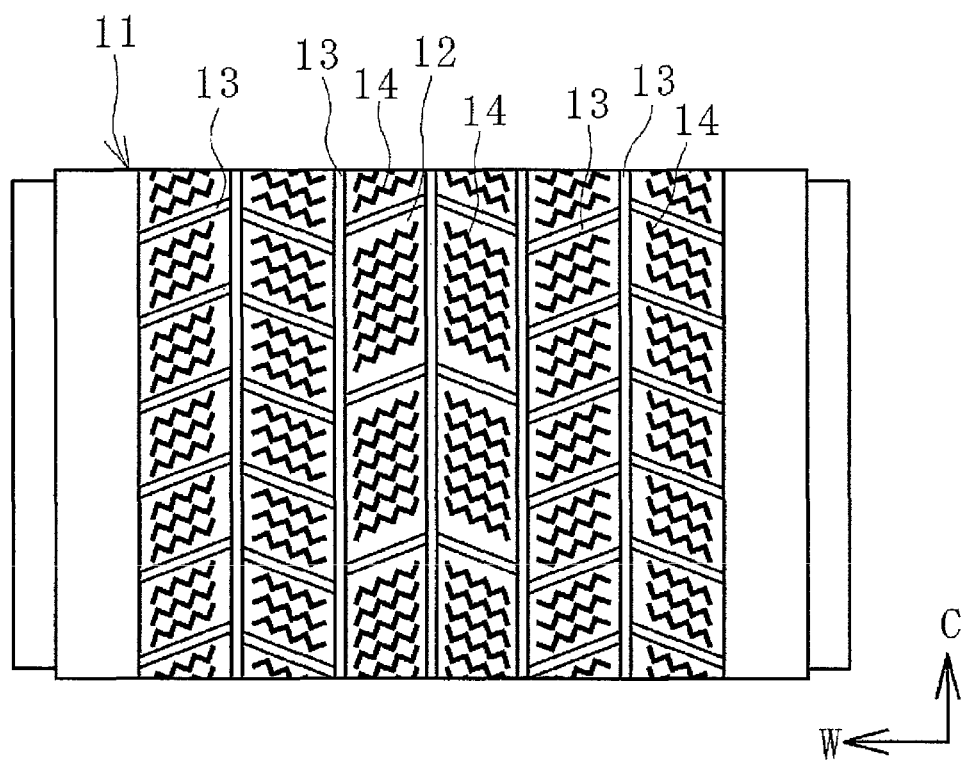
FIG. 2 is an explanatory diagram illustrating a molding surface of a studless-tire vulcanization mold in a plan view.

The mold 11 as a cleaning target is not only a normal-type mold but is also a studless-tire vulcanization mold illustrated in FIG. 2, for example. A groove forming projection 13 and sipe forming projection 14 are projected on the molding surface 12 of the mold 11. The groove forming projection 13 is integrally casted with a base material of the mold 11, and the sipe forming projection 14 is attached to the molding surface 12 as a separate body. The base material of the mold 11 is primarily aluminum, and material of the sipe forming projection 14 is steel or the like.

The thickness of the sipe forming projection 14 is approximately 0.4 to 1.2 mm. The groove forming projection 13 may be thin depending on a tread pattern of a tire, for example, in the case of a complicated tread pattern. Therefore, the sipe forming projection 14 or thin groove forming projection 13 are portions that are easily scratched when the mold is cleaned. Note that a C arrow, R arrow, and W arrow illustrated in FIG. 2 and FIG. 4 to FIG. 9 respectively indicate a circumferential direction, a radial direction, and width direction of a tire that is to be inserted and vulcanized in the mold 11.

Figure 3:
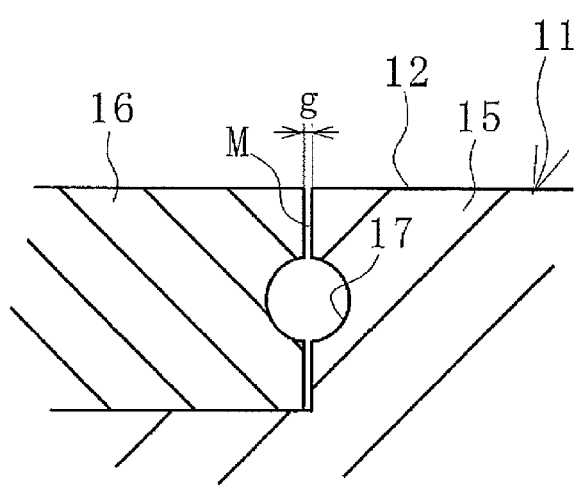
FIG. 3 is an explanatory diagram illustrating in an enlarged manner a molding surface of a cast splicing mold in a cross-sectional view.

Furthermore, an example of another type of the mold 11 as a cleaning target is a cast splicing mold for pneumatic tire vulcanization illustrated in FIG. 3. The mold 11 is manufactured by so-called cast splicing where a first casting part 15 is casted and then a second casting part 16 is casted. A small gap g is formed in a cast splicing part M between the first casting part 15 and the second casting part 16 due to solidification shrinkage of cast molten metal. The size of the small gap g is 5 to 80 µm, for example. An exhaust hole 17 connected to the small gap g is formed. In the mold 11, air and gas not required during tire vulcanization is discharged from the molding surface 12 to the exhaust hole 17 through the small gap g, and then discharged to the outside of the mold 11 through the exhaust hole 17. The small gap g is a portion that is easily scratched when the mold is cleaned.

Next, a procedure for cleaning the molding surface 12 of the mold 11 using the cleaning system 1 will be described.

First, the mold 11 to be cleaned is placed on the carrying-in conveyor device 10a. Next, the inlet door 9a is opened, and the carrying-in conveyor device 10a and the processing conveyor device 10b are operated to move the mold 11 to be cleaned onto the processing conveyor device 10b and position at a predetermined position. Thereafter, the inlet door 9a is closed to make the cleaning booth 9 a closed space. An interlocking structure is provided, in which the laser oscillator 2 is not actuated until the cleaning booth 9 is a closed space.

Figure 4:
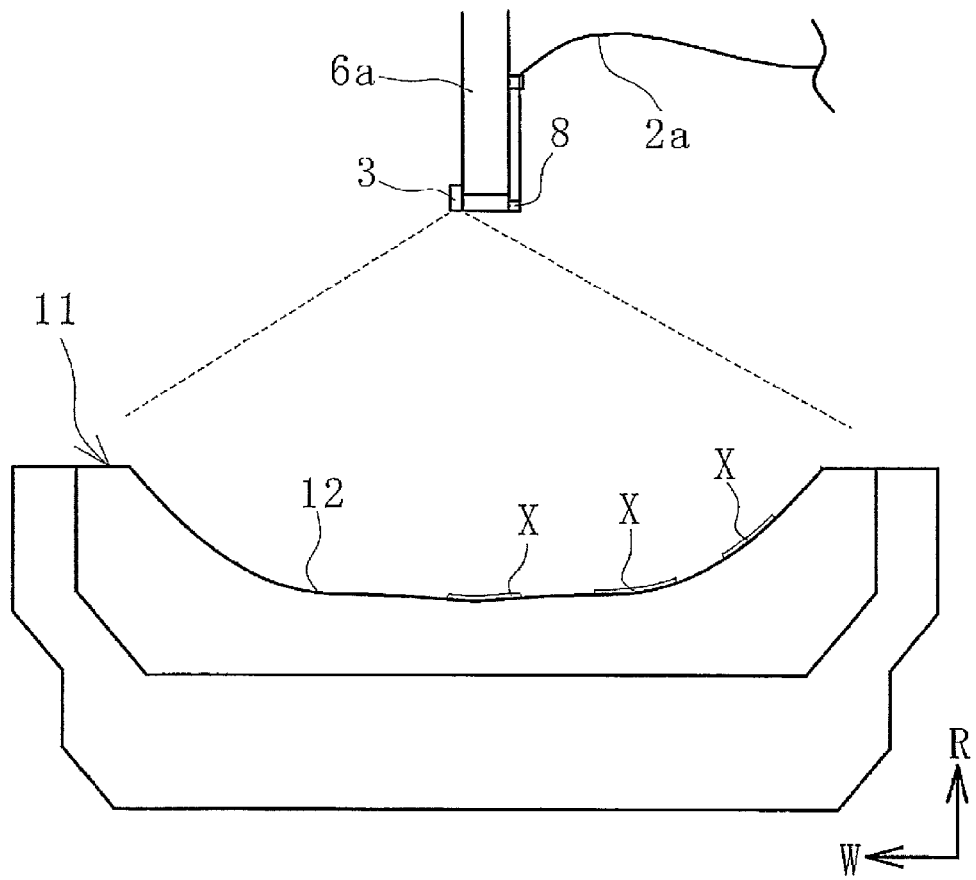
FIG. 4 is an explanatory diagram illustrating a camera and a mold to be cleaned in a front surface view.
Figure 5:
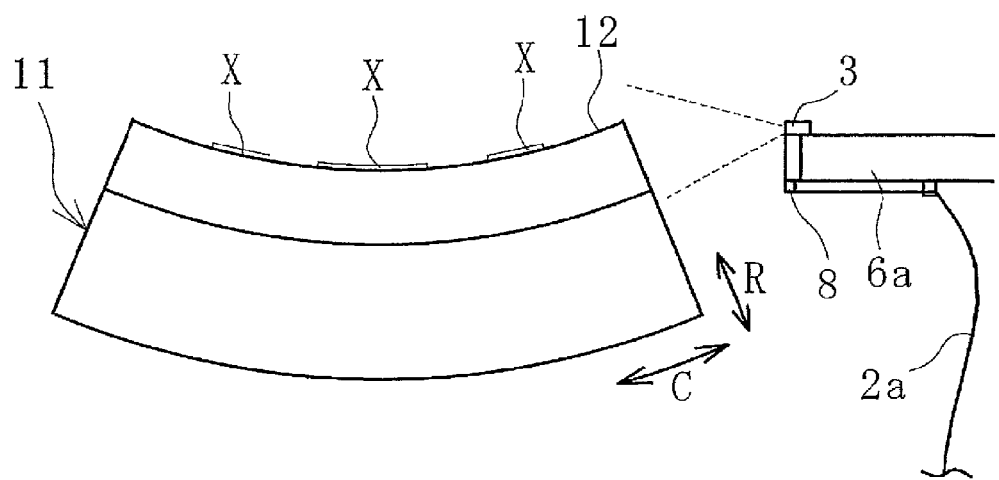
FIG. 5 is an explanatory diagram illustrating a camera and a mold to be cleaned in a side surface view.

Next, as illustrated in FIG. 4 and FIG. 5, the arm 6 is moved to dispose the camera 3 at an appropriate position, and three-dimensional image data of the molding surface 12 of the mold 11 is acquired. In this embodiment, a configuration is such that one camera 3 is moved to a desired position (a position above, a position to the side, or the like of the molding surface 12) by the arm 6 to acquire shape data of the molding surface 12. However, a plurality of the cameras 3 can be provided, and three-dimensional image data of the molding surface 12 can be acquired using the plurality of stationary cameras 3 to capture top surface shape data and side surface shape data of the molding surface 12.

Figure 6:
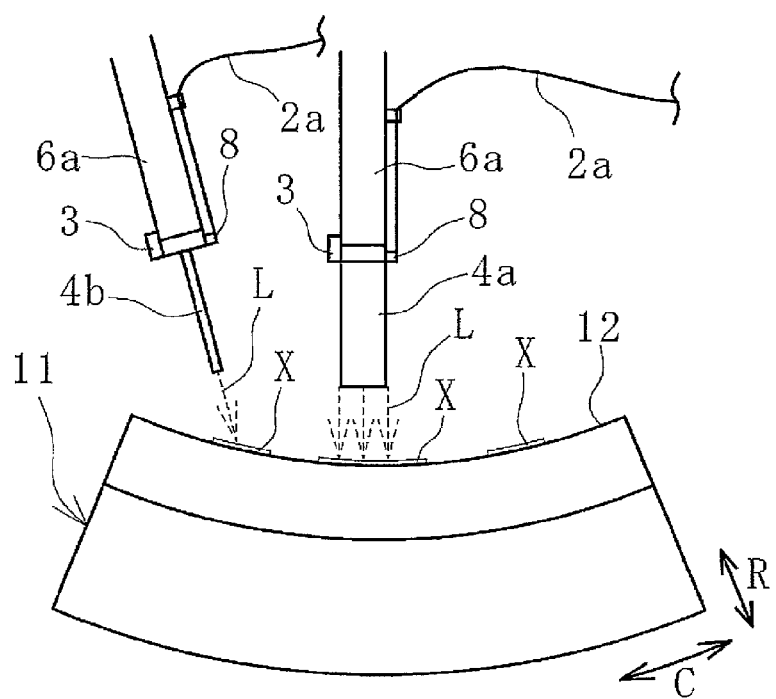
FIG. 6 is an explanatory diagram illustrating a laser head and a mold to be cleaned in a side surface view.
Figure 7:
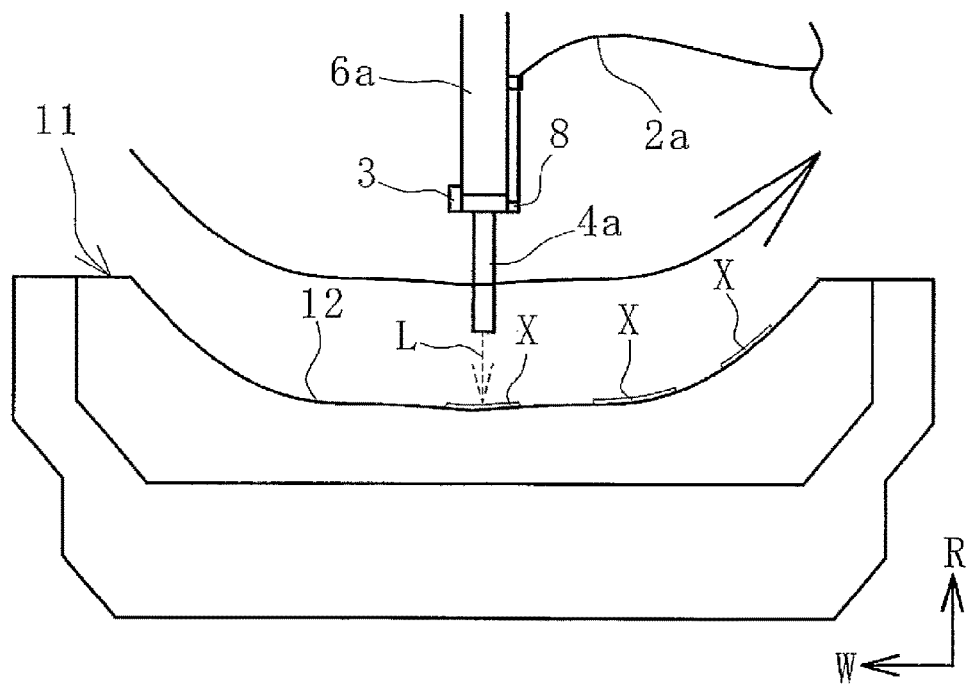
FIG. 7 is an explanatory diagram illustrating a laser head and a mold to be cleaned in a front surface view.

Next, movement of the arm 6 is controlled based on the acquired three-dimensional image data (shape data) of the molding surface 12 of the mold 11 to move the laser head 4 along the molding surface 12 as illustrated in FIG. 6 and FIG. 7. While the laser head 4 is moved in this manner, the laser beam L supplied from the laser oscillator 2 is irradiated on the molding surface 12. The contamination X adhered to the molding surface 12 is removed and cleaned by the irradiated laser beam L.

In order to suppress uneven irradiation of the laser beam L, a movement direction of the laser head 4 and irradiating direction of the laser beam L are controlled while maintaining an interval between a tip end of the laser head 4 and the opposing molding surface 12 to be as constant as possible. A movement velocity of the laser head 4 is as constant as possible, and the laser head 4 is moved so as to cover a cleaning target range.

The cleaning system 1 can have a plurality of the arms 6 or have one arm 6. In the embodiment illustrated in FIG. 6, two arms 6 that operate independently are provided, and therefore, two laser heads 4a, 4b are used together to irradiate the laser beam L, but in a case where one arm 6 is provided, a first laser head 4 can be used, and then a second laser head 4 can be used. For example, the laser beam L with a relatively large laser irradiation width is irradiated by moving the relatively large laser head 4a so as to cover a cleaning target range, and then the laser beam L is irradiated using the relatively small laser head 4b.

As described above, according to the present technology, when cleaning the mold 11, three-dimensional image data of the molding surface 12 of the mold 11 as the cleaning target is acquired by the camera 3. Therefore, a shape of the molding surface 12 can be accurately determined at the time of cleaning. Thereby, even in a case where multiple molds 11 with different molding surfaces 12 are cleaning targets, it is no longer required to perform manual operations for invoking the shape data of the molding surfaces 12 of the mold 11 to be cleaned and checking the correspondence relation between the actual mold and the shape data every time the cleaning is performed.

Furthermore, the laser head 4 is moved along the molding surface 12 based on the acquired image data while irradiating the laser beam L, and therefore, scratches on the molding surface 12 can be prevented while efficiently removing the contamination X without requiring manual work, even for a mold 11 having molding surface 12 with a complex shape, such as a studless-tire vulcanization mold or cast splicing mold for pneumatic tire vulcanization.

Furthermore, even in a case where the shape of the molding surface 12 changes over time, image data of the molding surface 12 at the time of cleaning is acquired, and the image data is utilized for moving the laser head 4, and therefore, complete cleaning is performed without leaving traces of contamination as compared to if the shape data of the molding surface 12 stored in advance is used, which is advantageous.

In this embodiment, the image data for the cleaned molding surface 12 is acquired again by the camera 3, and the cleanliness state of the molding surface 12 is determined based on the acquired image data. The determined cleanliness state and the position information of the molding surface are stored in the control device 7. After irradiating the laser beam L on the entire range of the molding surface 12, the laser beam L is irradiated to perform cleaning by moving the laser head 4 to a position of the molding surface 12 where the determined cleanliness state does not satisfy a preset standard.

A standard for determining if the cleanliness state is appropriate (contamination X is removed) or inappropriate (contamination X remains) is input and set to the control device 7 in advance. Therefore, whether the determined cleanliness state satisfies the preset standard is determined by the control device 7.

The standard for determining the cleanliness state is set based on a color density of the image data for the molding surface 12, acquired by the camera 3 for example. In a case where the density is greater than a certain degree, a cleanliness state indicating that the contamination X is remaining is set. Alternatively, the image data for the molding surface 12 can be acquired immediately before and immediately after the laser beam L is irradiated, the image data can be compared, and the standard can be set based on change in the color density. In a case where the color density has not changed or the degree of the change is small, the cleanliness state indicating that the contamination X is remaining is set. With this configuration, only a particularly contaminated position (range) is re-cleaned later, which is advantageous for efficiently and cleanly removing the contamination X.

A specific site can be input and set to the control device 7 in advance, and cleaning is performed using the relatively small laser head 4b or using the relatively large laser head 4a along with the laser head 4b having a relatively small laser irradiation width, with regard to the set specific site. Examples of the specific site include a range having a complex shape such as a range around the bottom of the sipe forming projection 14 illustrated in FIG. 2, or the like, and an inner circumferential surface of the small gap g in the cast splicing part M illustrated in FIG. 3.

With this configuration, the relatively small laser head 4b is used at a specific site where recesses and protrusions are intricately provided in a narrow range on the molding surface 12, and therefore, the laser head 4b can be disposed at an optimal position without interfering with the mold 11 or the like. Therefore, the laser beam L can be irradiated evenly even on a portion with a complex shape, and thus contamination is cleanly removed, which is advantageous. Alternatively, for the specific site, an entire body is roughly cleaned using a relatively large laser head 4a, and cleaning can be performed using a relatively small laser head 4b. With the relatively large laser head 4a, the laser irradiation width can be larger than the relatively small laser head 4b, and therefore, the cleaning time can be reduced and thus efficient cleaning is possible.

The temperature of the molding surface 12 where the laser beam L is irradiated can be successively detected by the temperature sensor 8. A permissible temperature is input and set to the control device 7 in advance. The permissible temperature is set to a predetermined temperature that does not reach a melting temperature of the mold 11. Irradiation of the laser beam L is interrupted when the temperature detected by the temperature sensor 8 exceeds the preset permissible temperature. For example, with this configuration, the molding surface 12 is avoided from being overheated by the irradiated laser beam L, even in cases where problems such as a reduced movement velocity or stopping of the laser head 4 due to unintentional factors, and the like occurs. In other words, problems where the molding surface 12 thermally deforms or is scratched by the laser beam L can be prevented.

After cleaning of the mold 11 is completed, the outlet door 9b is opened, and the processing conveyor belt 10b and the carrying-out conveyor belt 10c are operated to move the cleaned mold 11 from the inside to the outside of the cleaning booth 9. At this time, the inlet door 9a is opened, and the carrying-in conveyor belt 10a is operated to sequentially move the mold 11 to be cleaned from the outside to the inside of the cleaning booth 9 and position at a predetermined position on the processing conveyor 10b. Thereby, the mold 11 is sequentially and continuously cleaned.

Figure 8:
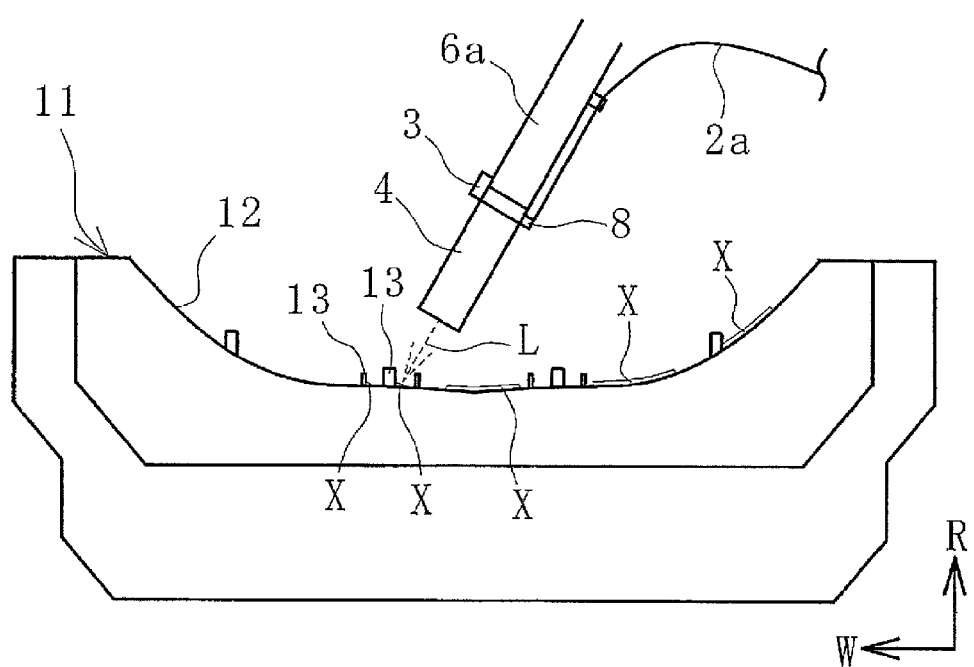
FIG. 8 is an explanatory diagram illustrating in a front surface view a condition where a laser beam is irradiated on a portion with a complex shape of a molding surface of a mold, according to another embodiment of the cleaning system.
Figure 9:
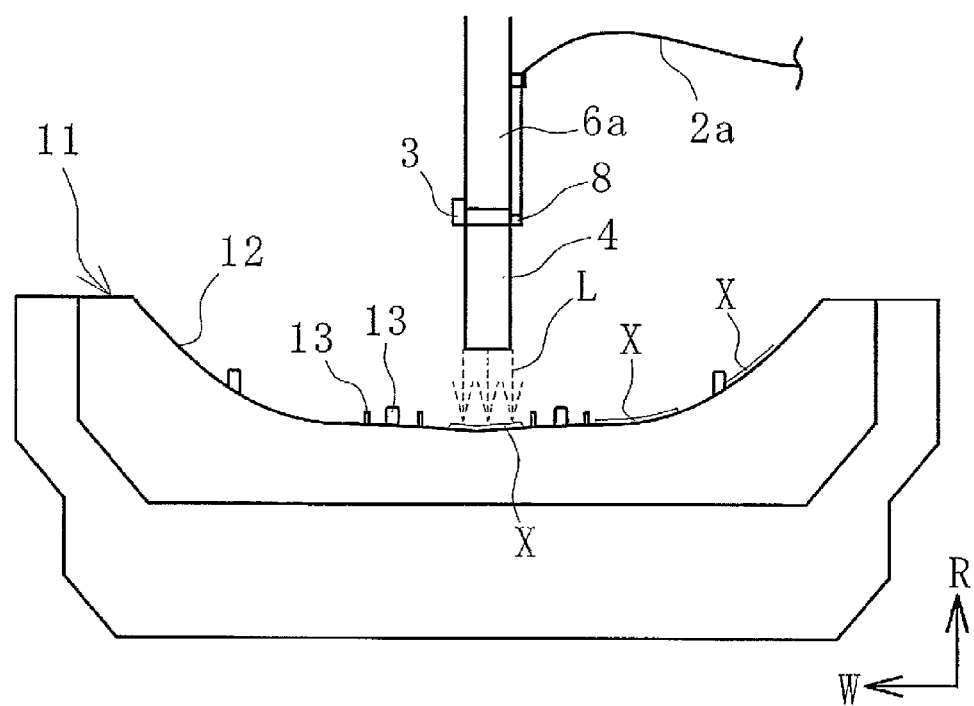
FIG. 9 is an explanatory diagram illustrating in a front surface view a condition where a laser beam is irradiated on a relatively flat and wide portion of a molding surface of a mold, using the cleaning system in FIG. 8.

In another embodiment of the mold cleaning system illustrated in FIG. 8 and FIG. 9, one laser head 4 is provided. The laser irradiation width of the laser head 4 is variable. An appropriate laser irradiation width is preset and input to the control device 7 for each site to be cleaned. For example, a relatively small laser irradiation width is set with regard to a site where recesses and protrusions are intricately provided in a narrow range of the molding surface 12, and a relatively large laser irradiation width is set with regard to a relatively flat and wide site.

As illustrated in FIG. 8, the laser beam L is irradiated at a relatively small laser irradiation width to performed cleaning with regard to a site where recesses and protrusions are intricately provided in a narrow range of the molding surface 12. Therefore, the laser beam L can be irradiated evenly even for a portion with a complex shape, and thus the contamination X is cleanly removed, which is advantageous. Furthermore, the laser beam L can be irradiated on only an intended range, and the laser beam L is not irradiated in an unintended range, and therefore, a problem can be avoided where the mold 11 is damaged due to the laser beam L being irradiated on a range where irradiation of the laser beam L is not required.

On the other hand, as illustrated in FIG. 9, cleaning is performed by switching the laser irradiation width and then irradiating the laser beam L at a relatively large irradiation width, with regard to a relatively flat and wide site. Thereby, a required range can be cleaned in a short period of time.

Thereby, even with one laser head 4, cleaning can be performed by switching to an appropriate laser irradiation width based on the shape or the like of a site to be cleaned, and therefore, versatility is enhanced. Note that in this embodiment, the various configurations and specifications described in the previous embodiment can also be used.

The invention claimed is:
1. A mold cleaning system, comprising:
   a laser oscillator;
   a laser head configured to irradiate a laser beam provided from the laser oscillator onto a molding surface of a mold;
   an arm configured to freely move the laser head three-dimensionally; and a control device configured to control movement of the arm; wherein a camera configured to acquire three-dimensional image data of a molding surface of a mold to be cleaned is provided, a plurality of laser heads with different head sizes are provided as the laser head, the laser heads being configured to irradiate laser beams and clean the molding surface while the laser heads are moved along the molding surface as controlled by the movement of the arm by the control device based on the image data acquired by the camera when cleaning the mold, and the control device is configured to:
  cause cleaning to be performed with regard to a specific preset site, using a relatively small laser head, or using a relatively small laser head in addition to a relatively large laser head,
  determine a cleanliness state of the molding surface based on the three-dimensional image data of the molding surface of the mold after cleaning, acquired by the camera,
  store the determined cleanliness state and position information of the molding surface, and
  cause the laser beam to be again irradiated from the laser head and cause cleaning to be performed with regard to a position of the molding surface where the determined cleanliness state does not satisfy preset standards.

2. The mold cleaning system according to claim 1, further comprising:
  a temperature sensor configured to successively detect a temperature of the molding surface where the laser beam is irradiated; wherein
  in a case where a temperature detected by the temperature sensor exceeds a preset permissible temperature, the control device is configured to interrupt irradiation of the laser beam.

3. The mold cleaning system according to claim 2, wherein the mold is a studless-tire vulcanization mold or a cast splicing mold for pneumatic tire vulcanization.

4. The mold cleaning system according to claim 1, wherein the mold is a studless-tire vulcanization mold or a cast splicing mold for pneumatic tire vulcanization.

5. The mold cleaning system according to claim 1, wherein the mold is a studless-tire vulcanization mold or a cast splicing mold for pneumatic tire vulcanization.

6. A mold cleaning system, comprising:
  a laser oscillator;
  a laser head configured to irradiate a laser beam provided from the laser oscillator onto a molding surface of a mold;
  an arm configured to freely move the laser head three-dimensionally; and
  a control device configured to control movement of the arm; wherein
  a camera configured to acquire three-dimensional image data of a molding surface of a mold to be cleaned is provided,
  a laser head having a variable laser irradiation width is provided as the laser head, the laser head being configured to irradiate laser beams and clean the molding surface while the laser head is moved along the molding surface as controlled by the movement of the arm by the control device based on the image data acquired by the camera when cleaning the mold,
  an appropriate laser irradiation width is preset for each site to be cleaned, and
  the control device is configured to:
    set the preset laser irradiation width for the sites to be cleaned and to cause the sites to be cleaned,
    determine a cleanliness state of the molding surface based on the three-dimensional image data of the molding surface of the mold after cleaning, acquired by the camera,
    store the determined cleanliness state and position information of the molding surface, and
    cause the laser beam to be again irradiated from the laser head and cause cleaning to be performed with regard to a position of the molding surface where the determined cleanliness state does not satisfy preset standards.

7. The mold cleaning system according to claim 6, further comprising:
  a temperature sensor configured to successively detect a temperature of the molding surface where the laser beam is irradiated; wherein
  in a case where a temperature detected by the temperature sensor exceeds a preset permissible temperature, the control device is configured to interrupt irradiation of the laser beam.

8. The mold cleaning system according to claim 7, wherein the mold is a studless-tire vulcanization mold or a cast splicing mold for pneumatic tire vulcanization.

9. The mold cleaning system according to claim 6, wherein the mold is a studless-tire vulcanization mold or a cast splicing mold for pneumatic tire vulcanization.

10. The mold cleaning system according to claim 6, wherein the mold is a studless-tire vulcanization mold or a cast splicing mold for pneumatic tire vulcanization.

* * * * *